(12) United States Patent
Sodagar

(10) Patent No.: US 11,327,191 B2
(45) Date of Patent: May 10, 2022

(54) SEISMIC MONO-FREQUENCY WORKFLOW FOR DIRECT GAS RESERVOIR DETECTION

(71) Applicant: Saudi Arabian Oil Company, Dhahran (SA)

(72) Inventor: Taher Mohammed Yusuf Sodagar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 518 days.

(21) Appl. No.: 16/401,993

(22) Filed: May 2, 2019

(65) Prior Publication Data

US 2020/0348432 A1    Nov. 5, 2020

(51) Int. Cl.
*G01V 1/30* (2006.01)
*G01V 1/32* (2006.01)

(52) U.S. Cl.
CPC ........... *G01V 1/301* (2013.01); *G01V 1/325* (2013.01); *G01V 2210/43* (2013.01)

(58) Field of Classification Search
CPC .... G01V 1/301; G01V 1/325; G01V 2210/43; G01V 2210/63; G01V 1/345; G01V 1/307
See application file for complete search history.

(56) References Cited

U.S. PATENT DOCUMENTS

| | | | |
|---|---|---|---|
| 6,982,927 B2 | 1/2006 | Taner | |
| 2008/0021656 A1* | 1/2008 | Saenger | G01V 1/28 702/16 |
| 2011/0295510 A1* | 12/2011 | Gulati | G01V 1/288 345/419 |
| 2017/0260842 A1* | 9/2017 | Jin | G01H 9/004 |
| 2018/0196156 A1* | 7/2018 | Assous | G01V 1/46 |
| 2020/0174149 A1* | 6/2020 | Thiruvenkatanathan | E21B 47/14 |

OTHER PUBLICATIONS

Castagna et al. , Instantaneous spectral analysis: Detection of low-frequency shadows associated with hydrocarbon (Year: 2003).*
Dai et al. , The Application of Frequency Hydrocarbon Detection Technique in a Lithological Reservoir of the Junggar Basin (Year: 2013).*

(Continued)

*Primary Examiner* — Mohammad K Islam
(74) *Attorney, Agent, or Firm* — Fish & Richardson P.C.

(57) ABSTRACT

The present disclosure describes methods and systems, including computer-implemented methods, computer program products, and computer systems for direct gas reservoir detection using frequency amplitude. One computer-implemented method includes spectrally decomposing seismic data associated with a target area into a plurality of mono-frequency volumes. Further, the method includes based on a low-frequency volume of the plurality of volumes, generating a low frequency map of the target area. Yet further, the method includes based on a high-frequency volume of the plurality of volumes, generating a high frequency map of the target area. Additionally, the method includes dividing the low frequency map by the high frequency map to generate a frequency ratio map. The method also includes using the frequency ratio map to identify a subsurface gas reservoir in the target area.

17 Claims, 6 Drawing Sheets

(56) References Cited

OTHER PUBLICATIONS

Alwusaibie, "Revealing the stratigraphic potential of a clastic reservoir using reservoir-to-shadow monofrequency (RSMF) and amplitude analysis in Saudi Arabia," SEG Technical Program Expanded Abstracts, Aug. 2017, 5 pages.

Sodagar, "Iso frequency spectral decomposition ratio technology workflow for gas carbonate field developments and characterization," First EAGE Reservoir Characterization and Modelling Workflows for Giant Carbonate Field, Feb. 18-21, 2019, Abu Dhabi, 4 pages.

PCT International Search Report and Written Opinion in International Appln. No. PCT/US2020/030787, dated Jul. 30, 2020, 14 pages.

GCC Examination Report in GCC Appln. No. GC 2020-3 9649, dated Aug. 21, 2021, 5 pages.

Castagna et al., "Instantaneous spectral analysis: detection of low frequency shadows associated with hydrocarbons," The Leading Edge, vol. 22, Feb. 2003, 6 pages.

Chakraborty and Okaya, "Frequency-time decomposition of seismic data using wavelet based methods," Geophysics vol. 60, No. 6, Nov.-Dec. 1995, 11 pages.

Chopra and Marfurt, "Seismic attributes for prospect identification and reservoir characterization," SEG geophysical developments series, No. 11, 2007, p. 123-150.

Partyka et al., "Interpretational application of spectral decomposition in reservoir characterization," The Leading Edge, vol. 18, Mar. 1999, 5 pages.

Zhang et al., "Fluid detection by spectral decomposition: lessons from numerical, physical modelling and field studies," Expanded Abstracts, 69th EAGE Meeting, London, Jun. 2007, 5 pages.

\* cited by examiner

SEISMIC MONO-FREQUENCY WORKFLOW FOR DIRECT GAS RESERVOIR DETECTION

TECHNICAL FIELD

This disclosure relates to improving seismic methods of gas detection.

BACKGROUND

Many of the current seismic methods of gas detection rely on an analysis of reflection amplitude of seismic data. Reflection amplitude, however, is affected by many variables including lithology, porosity, and fluid content of geological formations. Given the number of variables that affect reflection amplitude, accurately deriving one of those variables is difficult and unreliable, particularly fluid or gas content, from the reflection amplitude.

SUMMARY

The present disclosure describes methods and systems, including computer-implemented methods, computer program products, and computer systems for direct gas reservoir detection. One computer-implemented method includes spectrally decomposing seismic data associated with a target area into a plurality of mono-frequency volumes; based on a low-frequency volume of the plurality of volumes, generating a low-frequency map of the target area; based on a high-frequency volume of the plurality of volumes, generating a high-frequency map of the target area; dividing the low-frequency map by the high-frequency map to generate a frequency ratio map; and using the frequency ratio map to identify a subsurface gas reservoir in the target area.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware, installed on the system that in operation causes the system to perform the actions. One or more computer programs can be configured to perform particular operations or actions by virtue of including instructions that when executed by data processing apparatus cause the apparatus to perform the actions.

The foregoing and other implementations can each, optionally, include one or more of the following features, alone or in combination:

A first aspect, combinable with the general implementation, where based on a low-frequency volume of the plurality of volumes, generating a low frequency map of the target area includes: generating a reservoir interval low frequency map; generating a shadow zone low frequency map; and dividing the reservoir interval low frequency map by the shadow zone low frequency map to generate the low frequency map.

A second aspect, combinable with the general implementation, where based on a high-frequency volume of the plurality of volumes, generating a high frequency map of the target area includes: generating a reservoir interval high-frequency map; generating a shadow zone high-frequency map; and dividing the reservoir interval high-frequency map by the shadow zone high frequency map to generate the high-frequency map.

A third aspect, combinable with the general implementation, where the seismic data is a Relative Amplitude Preserved (RAP) processed three-dimensional (3D) Pre-Stack Time Migration (PSTM) seismic data volume.

A fourth aspect, combinable with the general implementation, where using the frequency ratio map to identify a subsurface gas reservoir in the target area includes: identifying a high amplitude frequency ratio in the frequency ratio map; and designating an area associated with the high amplitude frequency ratio as the subsurface gas reservoir.

A fifth aspect, combinable with the general implementation, where designating an area associated with the high amplitude frequency ratio as the subsurface gas reservoir includes: determining whether the high amplitude frequency ratio is greater than a threshold frequency ratio; and in response to determining that the high amplitude frequency ratio is greater than the threshold frequency ratio, determining that the high amplitude frequency ratio is indicative of a gas bearing region.

A sixth aspect, combinable with the general implementation, further including: displaying the frequency ratio map on a display device.

Particular implementations of the subject matter described in this specification can be implemented in order to improve seismic methods of gas reservoir detection. The improved methods generate a more accurate representation of the location of gas reservoirs than representations currently achieved in practice. Furthermore, the improved methods facilitate accurate drilling operations for extracting gas from an area of interest.

BRIEF DESCRIPTION OF THE DRAWINGS

Like reference numbers and designations in the various drawings indicate like elements.

DETAILED DESCRIPTION

The following detailed description describes systems and methods to improve seismic methods of gas detection, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Scattering theory indicates that a geological formation containing gas causes energy attenuation in seismic waves passing through the formation, particularly in the high-frequency components of the waves. As a result of the high attenuation of high-frequencies in the geological formation, areas below the gas-containing geological formations reflect anomalously low frequencies. These low frequencies are referred to as seismic shadows and the regions where seismic shadows occur are referred to as shadow zones. Because of their distinctive properties, seismic shadows have traditionally been used as direct hydrocarbon indicators. For instance, seismic shadows have been detected by identifying spectral differences in the seismic data collected from above and below the shadow zone.

However, in some cases, because of variations of the gas reservoir thickness, the gas does not cause energy attenuation in the seismic waves passing through the gas reservoir. In such cases, seismic shadows are not a reliable indicator of the presence of gas. Other shortcomings of relying on seismic shadows are that loose sands and porous sandstone have similar frequency responses to seismic shadows. Furthermore, there are other types of formations, such as gas clouds and gas chimneys, that also have seismic shadows. Therefore, a more reliable direct gas indicator is desired.

Disclosed are systems and methods for direct gas reservoir detection in a target formation based on frequency amplitudes of a seismic response of the target formation. In one implementation, a method produces a low frequency map indicative of the low frequency response of the target formation. The method also produces a high frequency map indicative of the high frequency response of the target formation. The method then divides the low frequency map by the high frequency map to produce a frequency amplitude ratio map of the target formation. The method uses the frequency amplitude ratio map to detect gas reservoirs in the target formation. For example, areas with high frequency amplitude ratios are designated as gas reservoirs.

Figure 1A:
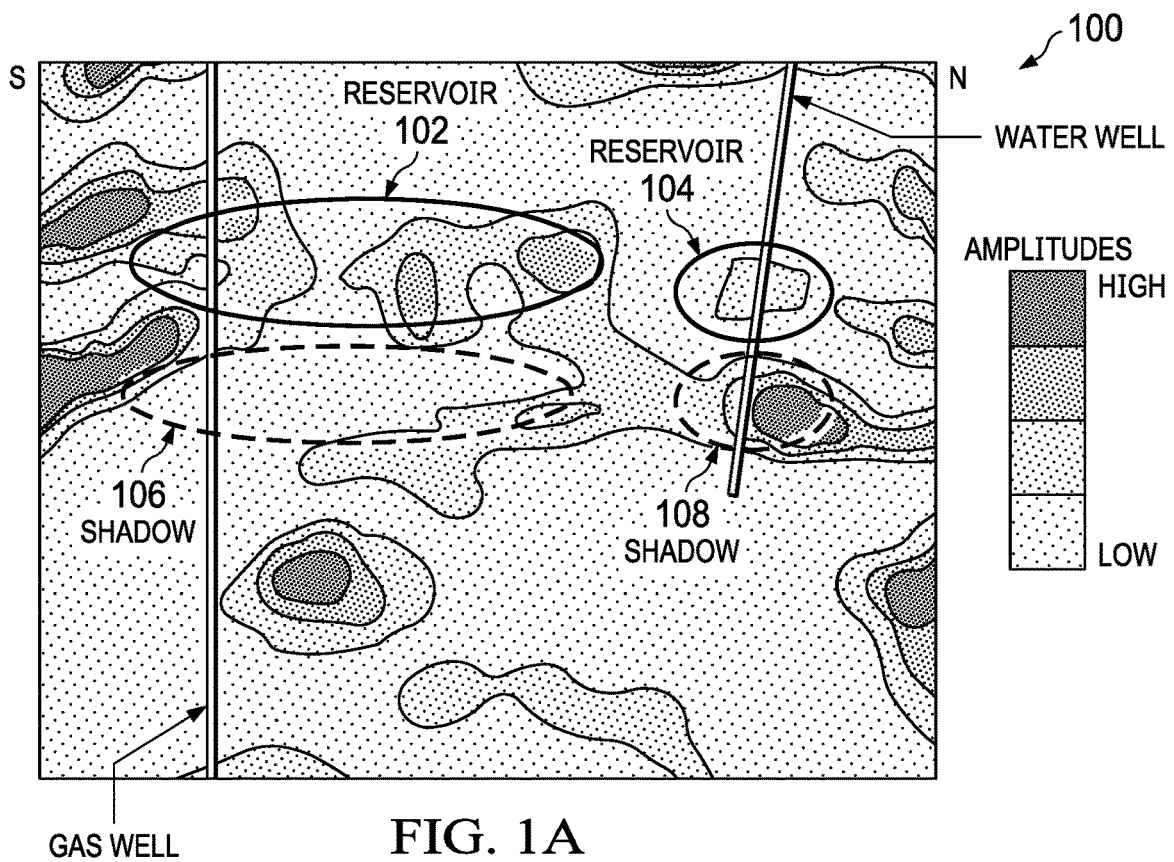
FIG. 1A is an example low mono-frequency seismic north-south cross-section, according to some implementations of the present disclosure.
Figure 1B:
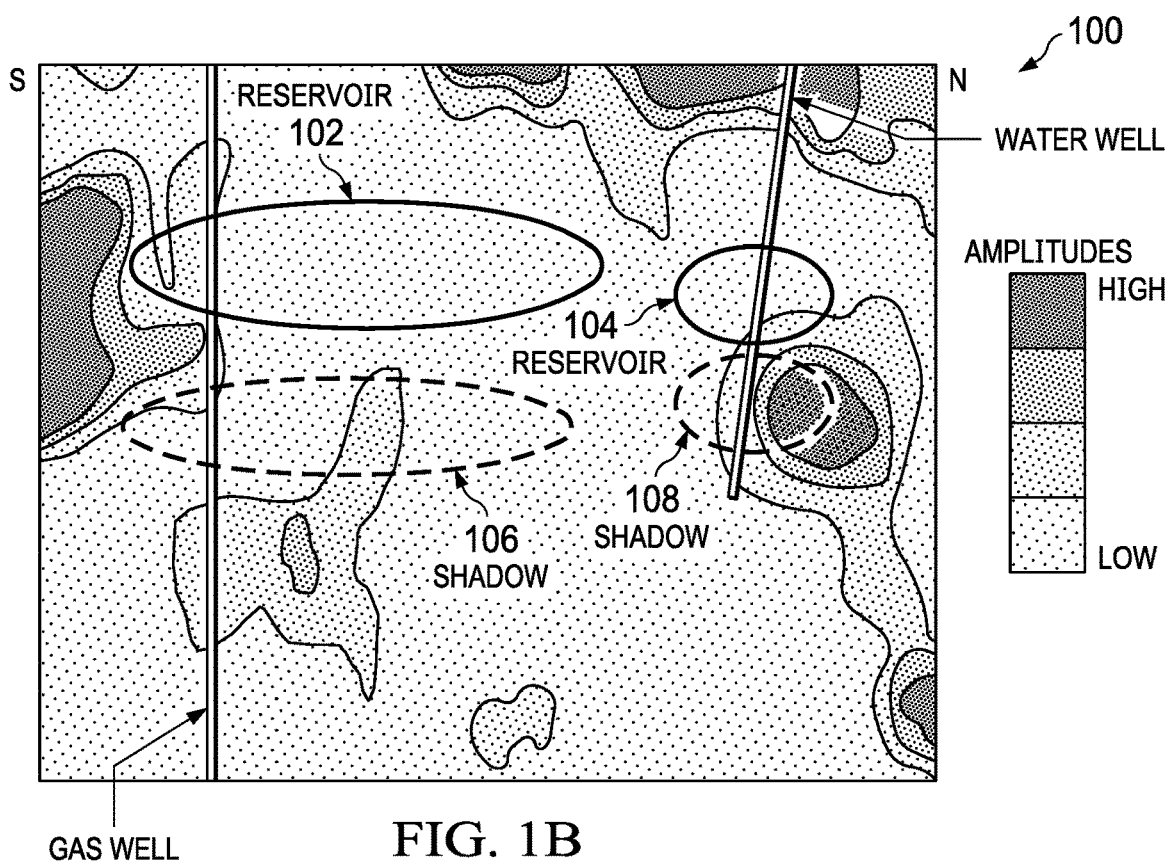
FIG. 1B is an example high mono-frequency seismic north-south cross-section, according to some implementations of the present disclosure.

FIGS. 1A and 1B illustrate low mono-frequency and high mono-frequency seismic north-south cross-sections, respectively. These cross-sections illustrate how frequency amplitude can be used to a direct gas reservoir indicator.

FIG. 1A is an example low mono-frequency seismic north-south cross-section 100 of a target formation, according to some implementations. For instance, the low mono-frequency is 10 Hertz (Hz). The north-south cross-section 100 illustrates amplitudes of the low mono-frequency in the target formation. In particular, the map 100 is color-coded such that warm colors indicate a high amplitude and cool colors indicate a low amplitude. As shown in FIG. 1A, a gas well 102 (labelled in FIG. 1A as gas reservoir 102) and a water well 104 (labelled in FIG. 1A as water reservoir 102) are located in the area of interest. The area beneath the wells 102, 104 are shadow zones 106, 108, respectively. As shown in FIG. 1A, the low mono-frequency has high amplitudes at the gas well 102 and low amplitudes at the gas well shadow zone 106. As also shown in FIG. 1A, the low mono-frequency has low to moderate amplitudes at the water well 104 and very high amplitudes at the water well shadow zone 108.

FIG. 1B is an example high mono-frequency seismic north-south cross-section 110 of the target formation, according to some implementations. For instance, the high mono-frequency is 40 Hz. The map 110 illustrates amplitudes of the high mono-frequency in the target formation. In particular, the map 110 is color-coded such that warm colors indicate a high amplitude and cool colors indicate a low amplitude. As shown in FIG. 1A, the high mono-frequency has low amplitudes at the gas well 102 (for example, lower amplitudes than the amplitudes of the low mono-frequency at the gas well 102). Further, the shadow zone 106 demonstrates improved to better amplitudes than the low mono-frequency amplitudes of the shadow zone 106. In addition, the map 110 shows low amplitudes at the water well 104 and lower amplitudes at the shadow zone 108 than the low mono-frequency amplitudes at the shadow zone 108.

As shown by FIGS. 1A and 1B, the amplitudes of the frequency seismic response of the gas well 102 are lower in higher frequencies than in lower frequencies. That is, the frequency amplitudes diminish more rapidly in higher frequencies (for example, 40 Hz) than in lower frequencies (for example, 10 Hz). Additionally, the amplitudes of the frequency seismic response of the shadow zone 106 are lower in lower frequencies than in higher frequencies. These frequency amplitude characteristics can be used to identify gas reservoirs. In particular, gas reservoirs have high amplitudes in lower frequency volumes that are promptly diminished in higher frequency volumes. And the shadow zones below the gas reservoirs have low amplitudes in lower frequency volumes that are promptly increased in higher frequency volumes.

In an embodiment, the frequency amplitude characteristics can be used to identify gas reservoirs by taking a ratio of the low frequency amplitudes to the high frequency amplitudes of a target formation. In particular, a greater frequency amplitude ratio at a location indicates that the low frequency amplitudes are greater than the high frequency amplitudes at that location. Because the amplitudes of the frequency responses in gas bearing reservoirs diminish more rapidly at higher frequencies than lower frequencies, the high frequency amplitude ratio is indicative of gas bearing regions. Conversely, a lower frequency amplitude ratio at a location indicates that the low frequency amplitudes are less than the high frequency amplitudes at that location. Therefore, the low frequency amplitude ratio is indicative of a non-gas reservoir region.

Figure 2:
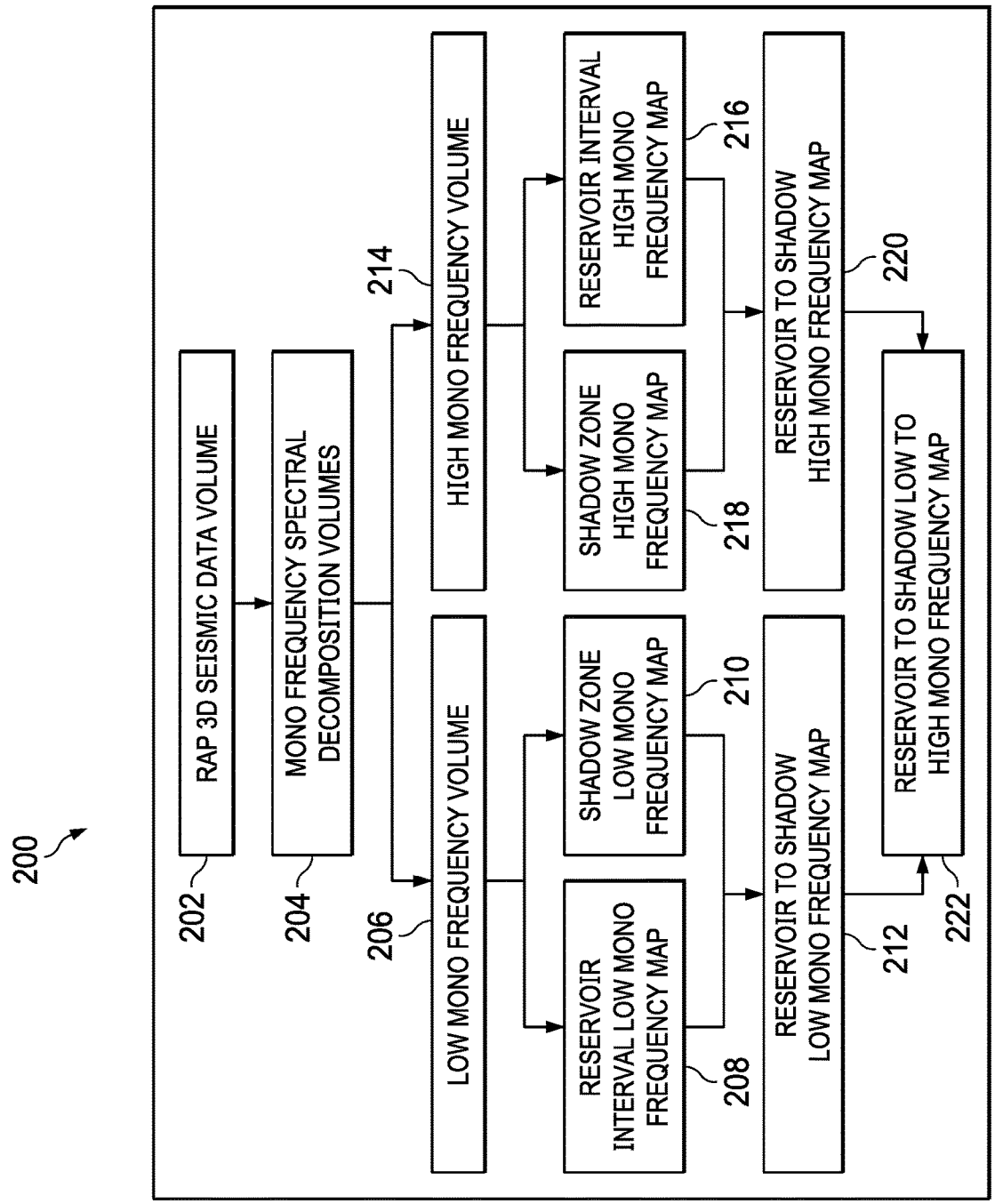
FIG. 2 is a simplified block diagram of an example workflow for direct gas reservoir detection, according to some implementations of the present disclosure.

FIG. 2 is a simplified block diagram of an example workflow 200 for direct gas reservoir detection, according to some implementations. The frequency ratio map is used to identify, based on frequency amplitude, gas reservoirs in the target formation. As described below, the workflow 200 generates the frequency ratio map using a low mono-frequency map and a high mono-frequency map of the target formation. Steps 206-212 generate the low mono-frequency map and steps 214-220 generate the high mono-frequency map. The frequency ratio map is then generated in step 222.

Figure 5:
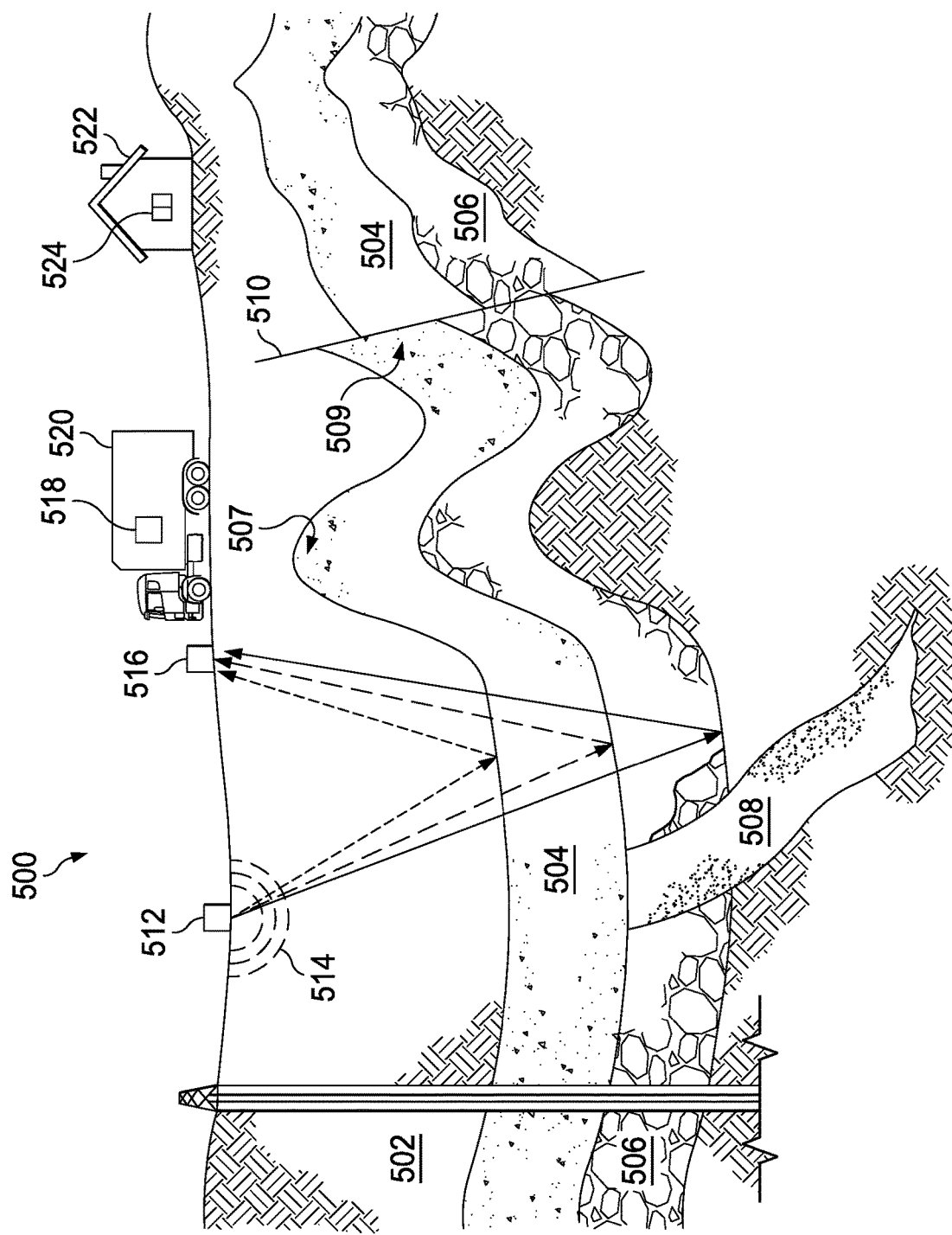
FIG. 5 is an example seismic survey, according to some implementations of the present disclosure.
Figure 6:
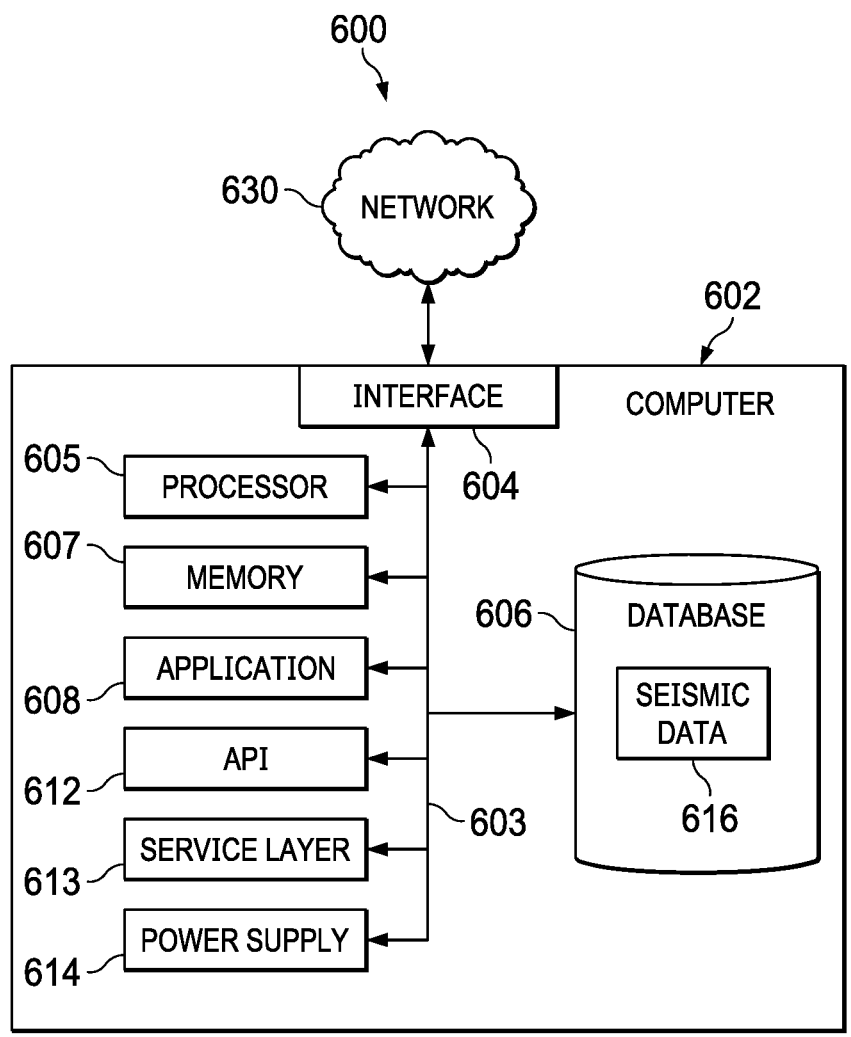
FIG. 6 is a block diagram of an example computer system used to provide computational functionalities associated with described algorithms, methods, functions, processes, flows, and procedures, according to some implementations of the present disclosure.

The workflow 200 starts at step 202 of receiving a three-dimensional (3D) seismic data volume. In an example, the 3D seismic data volume is received from a computing device different from a computing device executing the workflow 200. In another example, the 3D seismic data volume is generated by the same computing device or system that is executing the workflow 200. FIG. 5 illustrates an example seismic survey that generates seismic data. FIG. 6 illustrates an example computer system.

In an example, the 3D seismic data volume is a Relative Amplitude Preserved (RAP) processed 3D Pre-Stack Time Migration (PSTM) seismic data volume with noise attenuation and multiple removal. The main objectives of RAP seismic processing are to (i) broaden the frequency spectrum, (ii) preserve low frequencies and relative amplitudes, and (iii) attenuate outstanding multiple dominants at targeted reservoir levels. These objectives serve to provide ideal seismic data for qualitative and quantitative stratigraphic interpretation, which include representing true Earth reflectivity, maintaining sufficient correlation with well data, and preserving full frequency bandwidth. The stratigraphic seismic processing procedure employed involves high frequency aliased noise extraction, low frequency random noise removal, surface-related multiples attenuation, surface-consistent deconvolution, velocity analysis, PSTM, de-multiple sequence, and post-stack enhancement processing.

At step 204, the workflow 200 involves generating a plurality of mono-frequency spectral decomposition volumes. In general, each individual seismic trace in the 3D seismic data volume includes a wide-range of composed frequencies. In an implementation, the plurality of mono-frequency volumes may be generated by decomposing, splitting, or separating the 3D seismic data volume into several fundamental frequency band wavelets and sorting the wavelets into seismic frequency gathers. In an example, mono-frequency volumes from 10 to 40 Hz are constructed inclusively using increments of 10 Hz. Other frequency ranges are also possible. The selected frequency range may depend on the amplitude variations with wide or narrow range of frequencies at the subsurface reservoir in the target locations. For instance, if the targeted reservoirs are shallower in depth, then the frequency range 30-60 Hz is practical because shallow reservoirs contain higher frequencies than deeper reservoirs.

At step 206, the workflow 200 involves selecting a low mono-frequency volume from one of the mono-frequency spectral decomposition volumes. For instance, the low mono-frequency volume that is selected is one where amplitudes of the frequencies in gas reservoir locations is much higher than amplitudes of the frequencies in wet reservoir (for example, water well) locations. Additionally, the low mono-frequency volume that is selected is one where amplitudes of the frequencies in shadow zones below gas reservoirs attenuate more significantly than amplitudes of the frequencies in shadow zones below wet reservoirs. In an example, the selected low mono-frequency volume is a 10 Hz volume.

At step 208, the workflow 200 involves generating a reservoir interval low-frequency map. In an implementation, the reservoir interval low-frequency map is generated by averaging the seismic amplitudes vertically for the targeted reservoir at each seismic trace for the low frequency volume. For example, the targeted reservoir may be determined using gas column intervals from drilled gas wells.

At step 210, the workflow 200 involves generating a shadow zone low mono-frequency map. In an implementation, the shadow zone low-frequency map is generated by averaging vertically the seismic amplitudes for the area below the targeted reservoir at each seismic trace for the low frequency volume. For example, the area below the target reservoir may be determined using the intervals below the gas columns from drilled wells.

At step 212, the reservoir interval low-frequency map and the shadow zone low-frequency map are used to generate a low-frequency map of the target formation. In an implementation, the low-frequency map is generated by dividing the reservoir interval low-frequency map by the shadow zone low-frequency map. This map is also referred to as a reservoir to shadow low-frequency map.

At step 214, the workflow 200 involves selecting a high mono-frequency volume from one of the mono-frequency spectral decomposition volumes. For instance, the high mono-frequency volume that is selected is one where amplitudes of the frequencies in gas reservoir locations is very low. Additionally, the high mono-frequency volume that is selected is one where amplitudes of the frequencies in shadow zones below gas reservoirs are greater than amplitudes of the frequencies in shadow zones below gas reservoirs at the low mono-frequency volume. In an example, the selected high mono-frequency volume is a 40 Hz volume.

At step 216, the workflow 200 involves generating a reservoir interval high-mono frequency map. In an implementation, the reservoir interval high-frequency map is generated by averaging the seismic amplitudes vertically for the targeted reservoir at each seismic trace for the high frequency volume.

At step 218, the workflow 200 involves generating a shadow zone high mono-frequency map. In an implementation, the shadow zone high-frequency map is generated by averaging vertically the seismic amplitudes for the zone below the targeted reservoir at each seismic trace for the high frequency volume.

At step 220, the reservoir interval high-frequency map and the shadow zone high-frequency map are used to generate a high-frequency map of the target formation. In an implementation, the high-frequency map is generated by dividing the reservoir interval high-frequency map by the shadow zone high-frequency map. This map is also referred to as a reservoir to shadow high-frequency map.

At step 222, the workflow 200 generates a frequency amplitude ratio map of the target area. In an implementation, the frequency amplitude ratio map is generated by dividing the low-frequency map of the target area by the high-frequency map of the target formation. The frequency amplitude ratio map is used to identify gas reservoirs in the target formation. In an implementation, a frequency amplitude ratio greater than a threshold may be indicative of a gas reservoir. As such, an area associated with that frequency amplitude ratio is designated as a gas bearing region. The frequency amplitude ratio map can also be referred to as a "reservoir to shadow low to high mono frequency map."

In an implementation, threshold ratio is calculated using frequency amplitude ratios of confirmed gas reservoirs and frequency amplitude ratios of non-gas bearing regions (for example, tight or wet reservoirs). In an example, once a map is created, all the drilled wells (both gas and tight or wet) that penetrated the targeted area are posted and displayed on the map. Then, the frequency ratio values of gas wells are compared to those of tight or wet wells. A threshold or a margin figure is then identified and established based on the lowest value of the high frequency ratio on the final map at the positions of gas reservoir wells. Therefore, wherever the ratio values greater than this threshold or a margin figure would be indicative of gas.

Figure 3:
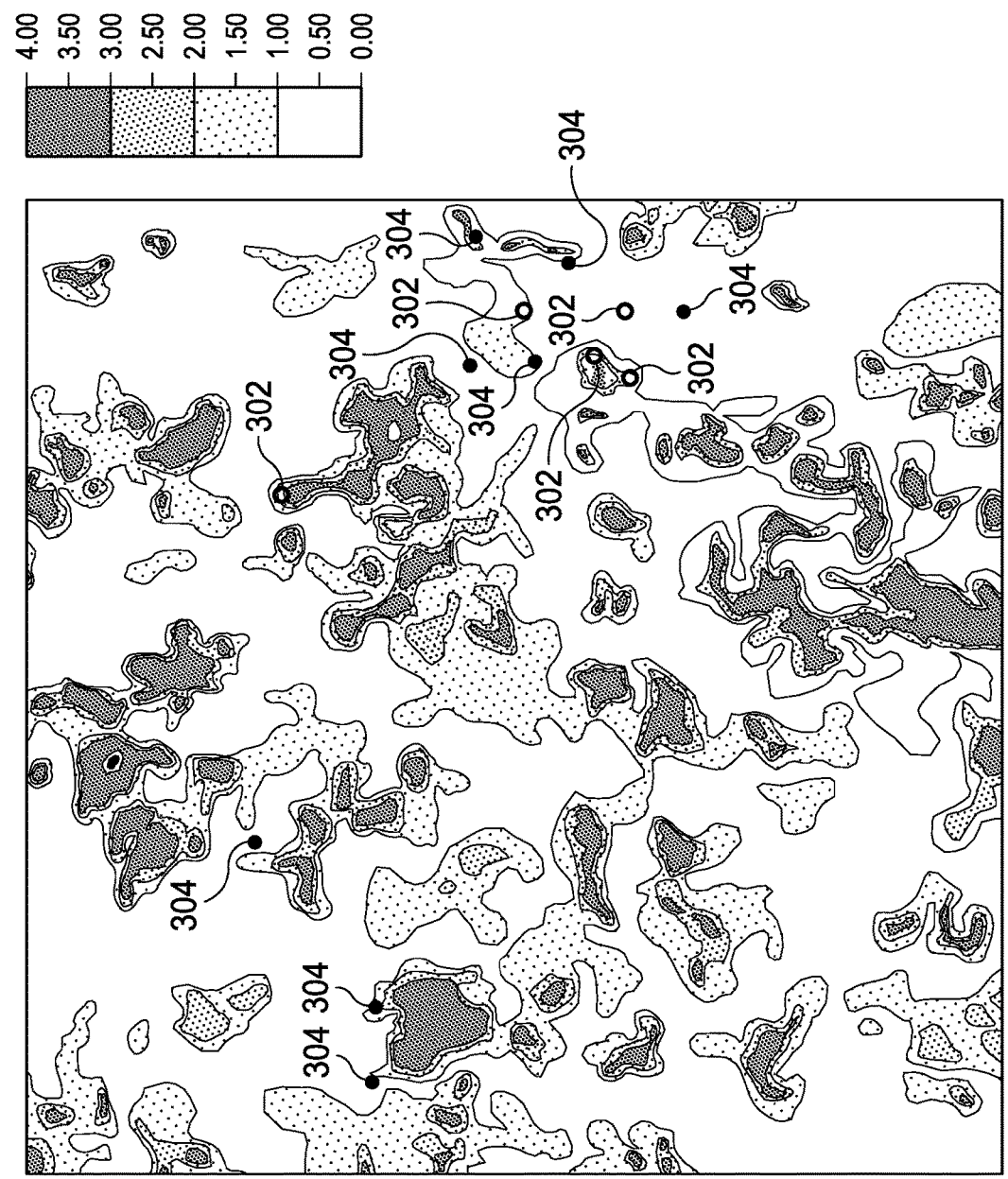
FIG. 3 is an example frequency amplitude ratio map, according to some implementations of the present disclosure.

FIG. 3 is an example frequency amplitude ratio map 300, according to some implementations. In an implementation, the frequency amplitude ratio map 300 is indicative of the frequency amplitude ratio at each location. Furthermore, the frequency-amplitude ratio map 300 is color-coded to indicate a magnitude of the frequency amplitude ratio. In particular, warm colors indicate greater frequency amplitudes and cool colors indicate smaller frequency amplitudes. A greater frequency amplitude at a location indicates that the low frequency amplitudes are greater than the high frequency amplitudes at that location. Because the amplitudes of the frequency responses in gas bearing reservoirs diminish more rapidly at higher frequencies than lower frequencies, the high frequency amplitude ratio is indicative of gas bearing regions. Conversely, a lower frequency amplitude ratio at a location indicates that the low frequency amplitudes are less than the high frequency amplitudes at that location. Therefore, the low frequency amplitude ratio is indicative of a non-gas reservoir region.

FIG. 3 also illustrates identified gas reservoirs 302 and wet reservoirs 304 in the target formation. In an example, the identified gas reservoirs 302 are associated with frequency amplitude ratios greater than a predetermined threshold ratio and the identified gas reservoirs 304 are associated with frequency amplitude ratios less than the predetermined threshold ratio. In some implementations, the frequency amplitude ratio map 300 may also identify and display identified shadow zones in the target formation. For example, the shadow zones may identifies as regions below gas reservoirs that have low amplitudes in lower frequency volumes that are promptly increased in higher frequency volumes. That is, in the frequency amplitude ratio map 300 the frequency ratio of shadow reservoirs is low because the shadow zones have low amplitudes in lower frequency volumes that are promptly increased in higher frequency volumes.

Figure 4:
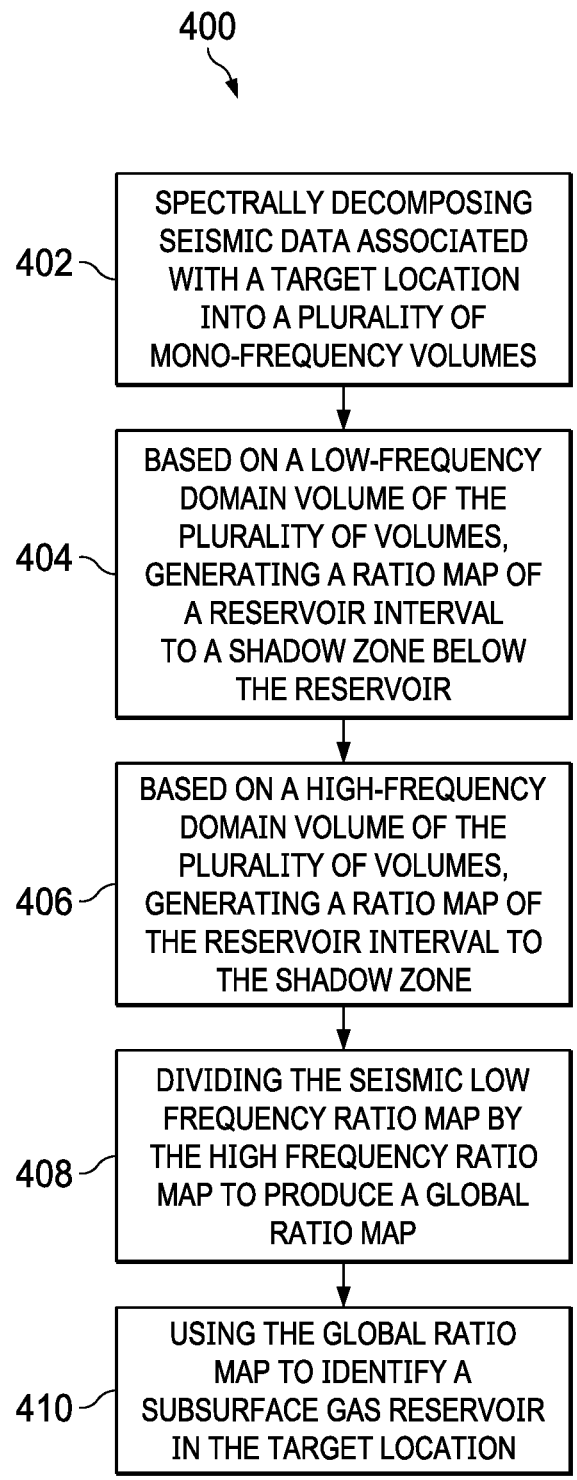
FIG. 4 is a flowchart of an example method for detecting gas reservoirs, according to some implementations of the present disclosure.

FIG. 4 is a flow chart of an example method 400 for detecting gas reservoirs, according to some implementations. For clarity of presentation, the description that follows generally describes method 400 in the context of the other figures in this description. For example, method 400 can be performed by a computer system described in FIG. 6. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

The method 400 starts at step 402, which involves spectrally decomposing seismic data associated with a target location into a plurality of mono-frequency volumes.

At step 404, method 400 involves based on a low-frequency domain volume of the plurality of volumes, generating a ratio map of a reservoir interval to a shadow zone below the reservoir.

At step 406, method 400 involves based on a high-frequency domain volume of the plurality of volumes, generating a ratio map of the reservoir interval to the shadow zone.

At step 408, method 400 involves dividing the seismic low frequency ratio map by the high frequency ratio map to produce a global ratio map.

At step 410, method 400 involves using the global ratio map to identify a subsurface gas reservoir in the target location.

The example method 400 shown in FIG. 4 can be modified or reconfigured to include additional, fewer, or different steps (not shown in FIG. 4), which can be performed in the order shown or in a different order. As an example, after step 410, a frequency amplitude ratio map of the target formation may be generated. In some implementations, the f frequency amplitude ratio map can be displayed on a display device, perhaps of the computing device that is performing method 400. This map can be used to visually indicate locations that contain gas. In some implementations, the displayed map view (or the displayed cross-sectional view can be used to locate potential areas for drilling or to identify lateral extent of a reservoir). As another example, the method 400 may additionally involve drilling in one or more locations where gas is present. This step may involve providing information indicative of the one or more locations to a controller (for example, a computing device) of the drilling operations. Based on the information provided, the controller may control drilling equipment to drill in the one or more locations.

In some implementations, one or more of the steps shown in FIG. 4 can be repeated or reiterated, for example, until a terminating condition is reached. In some implementations, one or more of the individual steps shown in FIG. 4 can be executed as multiple separate steps, or one or more subsets of the steps shown in FIG. 4 can be combined and executed as a single step. In some implementations, one or more of the individual steps shown in FIG. 4 may also be omitted from the example method 400.

FIG. 5 is an example seismic survey, according to some implementations of the present disclosure. In an implementation, the seismic survey is being performed to map subterranean features such as facies and faults in a subterranean formation 500. The seismic data generated by the seismic survey can be used as an input to the disclosed seismic mono-frequency workflow. The subterranean formation 500 includes a layer of impermeable cap rocks 502 at the surface. Facies underlying the impermeable cap rocks 502 include a sandstone layer 504, a limestone layer 506, and a sand layer 508. A fault line 510 extends across the sandstone layer 504 and the limestone layer 506.

A seismic source 512 (for example, a seismic vibrator or an explosion) generates seismic waves 514 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 500, the velocity of seismic waves traveling through the subterranean formation 500 will be different in the sandstone layer 504, the limestone layer 506, and the sand layer 508. As the seismic waves 514 contact interfaces between geologic bodies or layers that have different velocities, the interface reflects some of the energy of the seismic wave and refracts part of the energy of the seismic wave. Such interfaces are sometimes referred to as horizons.

The seismic waves 514 are received by a sensor or sensors 516. Although illustrated as a single component in FIG. 5, the sensor or sensors 516 are typically a line or an array of sensors 516 that generate an output signal in response to received seismic waves including waves reflected by the horizons in the subterranean formation 500. The sensors 516 can be geophone-receivers that produce electrical output signals transmitted as input data, for example, to a computer 518 on a seismic control truck 520. Based on the input data, the computer 518 may generate a seismic data output such as, for example, a seismic two-way response time plot.

A control center 522 can be operatively coupled to the seismic control truck 520 and other data acquisition and wellsite systems. The control center 522 may have computer facilities for receiving, storing, processing, and/or analyzing data from the seismic control truck 520 and other data acquisition and wellsite systems. For example, computer systems 524 in the control center 522 can be configured to analyze, model, control, optimize, or perform management tasks of field operations associated with development and production of resources such as oil and gas from the subterranean formation 500. Alternatively, the computer systems 524 can be located in a different location than the control center 522. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 524 may be displayed for user viewing using local or remote monitors or other display units. One approach to analyzing seismic data is to associate the data with portions of a seismic cube representing represent the subterranean formation 500. The seismic cube can also display results of the analysis of the seismic data associated with the seismic survey.

FIG. 6 is a block diagram of an example computer system 600 used to provide computational functionalities associated with described algorithms, methods, functions, processes, flows, and procedures, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tapes, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers to read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:

1. A method comprising:
spectrally decomposing seismic data associated with a target area into a plurality of mono-frequency volumes;
based on (i) low-frequency volume of the plurality of volumes, (ii) a reservoir interval in the target area, and (iii) a shadow zone in the target area, generating a low-frequency map of the target area;
based on (i) a high-frequency volume of the plurality of volumes, (ii) the reservoir interval in the target area, and (iii) the shadow zone in the target area, generating a high-frequency map of the target area;
dividing the low-frequency map by the high-frequency map to generate a frequency ratio map;
identifying, in the frequency ratio map, a frequency ratio greater than a threshold frequency ratio; and
determining that the identified frequency ratio is indicative of a subsurface gas reservoir in the target area.

2. The method of claim 1, wherein based on (i) a low-frequency volume of the plurality of volumes, (ii) a reservoir interval in the target area, and (iii) a shadow zone in the target area, generating a low-frequency map of the target area comprises:
generating a reservoir interval low-frequency map;
generating a shadow zone low-frequency map; and
dividing the reservoir interval low-frequency map by the shadow zone low-frequency map to generate the low-frequency map.

3. The method of claim 1, wherein based on (i) a high-frequency volume of the plurality of volumes, (ii) the reservoir interval in the target area, and (iii) the shadow zone in the target area, generating a high-frequency map of the target area comprises:
generating a reservoir interval high-frequency map;
generating a shadow zone high-frequency map;
and dividing the reservoir interval high-frequency map by the shadow zone high-frequency map to generate the high-frequency map.

4. The method of claim 1, wherein the seismic data is a Relative Amplitude Preserved (RAP) processed three-dimensional (3D) Pre-Stack Time Migration (PSTM) seismic data volume.

5. The method of claim 1, wherein determining that the identified frequency ratio is indicative of a subsurface gas reservoir in the target area comprises:
designating an area associated with the identified frequency ratio as the subsurface gas reservoir.

6. The method of claim 1, further comprising:
displaying the frequency ratio map on a display device.

7. A device comprising:
a memory; and
a processing unit that is arranged to perform operations including:
spectrally decomposing seismic data associated with a target area into a plurality of mono-frequency volumes;
based on (i) a low-frequency volume of the plurality of volumes, (ii) a reservoir interval in the target area, and (iii) a shadow zone in the target area, generating a low-frequency map of the target area;
based on (i) a high-frequency volume of the plurality of volumes, generating a high-frequency map of the target area;
dividing the low-frequency map by the high-frequency map to generate a frequency ratio map;
identifying, in the frequency ratio map, a frequency ratio greater than a threshold frequency ratio; and
determining that the identified frequency ratio is indicative of a subsurface gas reservoir in the target area.

8. The device of claim 7, wherein based on (i) a low-frequency volume of the plurality of volumes, (ii) a reservoir interval in the target area, and (iii) a shadow zone in the target area, generating a low-frequency map of the target area comprises:
generating a reservoir interval low frequency map;
generating a shadow zone low-frequency map; and
dividing the reservoir interval low-frequency map by the shadow zone low-frequency map to generate the low-frequency map.

9. The device of claim 7, wherein based on (i) a high-frequency volume of the plurality of volumes, (ii) the reservoir interval in the target area, and (iii) the shadow zone in the target area, generating a high-frequency map of the target area comprises:
generating a reservoir interval high-frequency map;
generating a shadow zone high-frequency map; and
dividing the reservoir interval high-frequency map by the shadow zone high-frequency map to generate the high-frequency map.

10. The device of claim 7, wherein the seismic data is a Relative Amplitude Preserved (RAP) processed three-dimensional (3D) Pre-Stack Time Migration (PSTM) seismic data volume.

11. The device of claim 7, wherein determining that the identified frequency ratio is indicative of a subsurface gas reservoir in the target area comprises:

designating an area associated with the identified frequency ratio as the subsurface gas reservoir.

12. The device of claim 7, the operations further comprising:
displaying the frequency ratio map on a display device.

13. A non-transitory computer-readable medium storing instructions executable by a computer system to perform operations comprising:
spectrally decomposing seismic data associated with a target area into a plurality of mono-frequency volumes;
based on (i) low-frequency volume of the plurality of volumes, (ii) a reservoir interval in the target area, and (iii) a shadow zone in the target area, generating a low-frequency map of the target area;
based on (i) a high-frequency volume of the plurality of volumes, (ii) the reservoir interval in the target area, and (iii) the shadow zone in the target area, generating a high-frequency map of the target area;
dividing the low-frequency map by the high-frequency map to generate a frequency ratio map;
identifying, in the frequency ratio map, a frequency ratio greater than a threshold frequency ratio; and
determining that the identified frequency ratio is indicative of a subsurface gas reservoir in the target area.

14. The non-transitory computer-readable medium of claim 13, wherein based on (i) a low-frequency volume of the plurality of volumes, (ii) a reservoir interval in the target area, and (iii) a shadow zone in the target area, generating a low-frequency map of the target area comprises:
generating a reservoir interval low frequency map;
generating a shadow zone low-frequency map; and
dividing the reservoir interval low-frequency map by the shadow zone low-frequency map to generate the low-frequency map.

15. The non-transitory computer-readable medium of claim 13, wherein based on (i) a high-frequency volume of the plurality of volumes, (ii) the reservoir interval in the target area, and (iii) the shadow zone in the target area, generating a high-frequency map of the target area comprises:
generating a reservoir interval high-frequency map;
generating a shadow zone high-frequency map; and
dividing the reservoir interval high-frequency map by the shadow zone high-frequency map to generate the high-frequency map.

16. The non-transitory computer-readable medium of claim 13, wherein the seismic data is a Relative Amplitude Preserved (RAP) processed three-dimensional (3D) Pre-Stack Time Migration (PSTM) seismic data volume.

17. The non-transitory computer-readable medium of claim 13, wherein determining that the identified frequency ratio is indicative of a subsurface gas reservoir in the target area comprises:
designating an area associated with the identified frequency ratio as the subsurface gas reservoir.

* * * * *

UNITED STATES PATENT AND TRADEMARK OFFICE
CERTIFICATE OF CORRECTION

PATENT NO. : 11,327,191 B2
APPLICATION NO. : 16/401993
DATED : May 10, 2022
INVENTOR(S) : Sodagar Page 1 of 1

It is certified that error appears in the above-identified patent and that said Letters Patent is hereby corrected as shown below:

In the Claims

Column 15, Line 42, Claim 1, after "(i)" insert -- a --;

Column 17, Line 11 (approx.), Claim 13, after "(i)" insert -- a --.

Signed and Sealed this
Sixteenth Day of August, 2022

Katherine Kelly Vidal
*Director of the United States Patent and Trademark Office*